United States Patent
Miwa et al.

(10) Patent No.: US 7,953,368 B2
(45) Date of Patent: May 31, 2011

(54) RFIC CHIP, AND POSITION RECOGNITION SYSTEM AND SECURITY SYSTEM USING THE SAME

(75) Inventors: Yohichi Miwa, Yokohama (JP); Aya Minami, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 11/304,848

(22) Filed: Dec. 14, 2005

(65) Prior Publication Data

US 2006/0138653 A1    Jun. 29, 2006

(30) Foreign Application Priority Data

Dec. 24, 2004    (JP) .................. 2004-374264

(51) Int. Cl.
*H04B 5/00* (2006.01)
(52) U.S. Cl. ........................ 455/41.1; 257/728
(58) Field of Classification Search .................. 455/41.1
See application file for complete search history.

(56) References Cited

U.S. PATENT DOCUMENTS

| | | | | |
|---|---|---|---|---|
| 5,606,739 A * | 2/1997 | Goto | .......................... | 455/343.3 |
| 5,874,902 A * | 2/1999 | Heinrich et al. | ............ | 340/10.51 |
| 6,378,774 B1 * | 4/2002 | Emori et al. | .................. | 235/492 |
| 7,471,199 B2 * | 12/2008 | Zimmerman et al. | ..... | 340/572.1 |
| 2001/0027532 A1 * | 10/2001 | Hoshino et al. | ............... | 713/340 |
| 2002/0067267 A1 * | 6/2002 | Kirkham | ................... | 340/572.7 |
| 2003/0076262 A1 * | 4/2003 | Forrester et al. | ........ | 343/700 MS |
| 2003/0083037 A1 * | 5/2003 | Yajima et al. | .................. | 455/343 |
| 2004/0185685 A1 * | 9/2004 | Nishizawa et al. | ............. | 439/66 |
| 2005/0052245 A1 * | 3/2005 | Rofougaran | ................... | 330/301 |
| 2005/0108317 A1 * | 5/2005 | Someya et al. | ............... | 709/200 |
| 2005/0133707 A1 * | 6/2005 | Ichiyanagi | ..................... | 250/234 |
| 2005/0136878 A1 * | 6/2005 | Khorram | ....................... | 455/333 |
| 2005/0152108 A1 * | 7/2005 | Goel et al. | ..................... | 361/683 |
| 2005/0189426 A1 * | 9/2005 | Nishizawa et al. | ............ | 235/492 |
| 2005/0242429 A1 * | 11/2005 | Rofougaran | .................. | 257/728 |
| 2006/0038731 A1 * | 2/2006 | Turner et al. | .................. | 343/742 |

FOREIGN PATENT DOCUMENTS

| | | |
|---|---|---|
| JP | 10289296 | 12/1998 |
| JP | 2000011105 | 1/2000 |
| JP | 2004519050 T | 6/2004 |

\* cited by examiner

*Primary Examiner* — Edward Urban
*Assistant Examiner* — Erica Fleming-Hall
(74) *Attorney, Agent, or Firm* — Steven Chiu; Shimokaji & Associates, P.C.

(57) ABSTRACT

Included are: a circuit unit having a non-volatile memory; a circuit unit having a volatile memory; a read-write circuit for reading data from, writing data into, the non-volatile memory, and for reading data from, writing data into, the volatile memory; an antenna and an RF amplifier which are first power supply means for receiving a first radio wave, and for supplying power to the circuit unit; and an antenna and an RF amplifier which are second power supply means for receiving a second radio wave whose frequency is different from that of the first radio wave, and for supplying power to the circuit unit.

6 Claims, 7 Drawing Sheets

DATA(CLASSIFIED INFORMATION)
CAN BE READ

DATA(CLASSIFIED INFORMATION)
CANNOT BE READ

DATA(CLASSIFIED INFORMATION)
CAN BE READ

DATA(CLASSIFIED INFORMATION)
CANNOT BE READ

FIG. 8

RFIC CHIP, AND POSITION RECOGNITION SYSTEM AND SECURITY SYSTEM USING THE SAME

BACKGROUND OF THE INVENTION

The present invention relates to a radio frequency IC chip which is supplied with power using radio waves for communications and in which information can be read and written using the radio waves in a non-contact manner.

In recent years, attention has been focused on a technology called radio-frequency identification (RF-ID) in which a person or an object is identified and managed using a radio frequency integrated circuit (RFIC) chip. An RFIC chip (also referred to as an RF-ID tag, an RFIC tag, and the like) used in RF-ID communicates with a reader/writer by use of radio waves or electromagnetic waves, and can operate without having a battery by a technology for transmitting power from an antenna side in a non-contact manner (e.g., see Patent Documents 1 and 2 and Non-Patent Document 1).

Generally, an RFIC chip has a non-volatile memory in the chip, and data can be read from or written into the non-volatile memory by communicating with the chip by radio waves or the like using a reader/writer. By using the non-volatile memory, written data does not disappear but is maintained even when power supply is cut off because the RFIC chip stops receiving radio waves from the reader/writer.

Utilizing this, distribution management and process management for items can be performed by attaching the RFIC chip to an item in a distributing stage or a manufacturing stage, and appropriately reading information from, or writing information into, the non-volatile memory in each stage.

(Patent Document 1) Japanese Unexamined Patent Publication No. 2001-291079

(Patent Document 2) Japanese Unexamined Patent Publication No. 2003-331238

(Non-Patent Document 1) "Kiso kara wakaru musen IC tag" (online), Jan. 20, 2004, Nikkei Business Publications, Inc., (searched on Jul. 30, 2004), the URL <http://itpro.nikkeibp.co.jp/free/NBY/RFID/20031204/3/mokuji.jsp>

However, as described previously, data written in a non-volatile memory is maintained even when power supply is cut off because an RFIC chip stops receiving radio waves from a reader/writer. Accordingly, deleting already-written data requires an effort because other data needs to be overwritten using the reader/writer. Further, convenience is insufficient because data cannot be deleted in the state where radio waves from the reader/writer are not received.

Moreover, data written in the non-volatile memory can be read using the reader/writer anytime. Therefore, from the viewpoint of information security, it has been difficult to use the RFIC chip in such a manner that information to be concealed is written into the non-volatile memory.

SUMMARY OF THE INVENTION

Accordingly, an object of the present invention is to provide an RFIC chip in which convenience is improved by adding to the RFIC chip a mechanism for holding data only when the RFIC chip is receiving radio waves from a reader/writer and for allowing the data to disappear when the reception of radio waves stops, and to provide a system using such an RFIC chip.

In order to achieve the above-described object, the present invention is realized as an RFIC chip configured as follows. The RFIC chip includes: a first circuit unit including a non-volatile memory; a second circuit unit including a volatile memory; read-write means for reading data from, and writing data into, the non-volatile memory, and for reading data from, and writing data into, the volatile memory; first power supply means for receiving a first radio wave, and for supplying power to the first circuit unit; and second power supply means for receiving a second radio wave whose frequency is different from that of the first radio wave, and for supplying power to the second circuit unit.

Here, this RFIC chip may include: read-write means for reading data from, and writing data into, the volatile memory; and read-write means for reading data from, and writing data into, the non-volatile memory. Further, the first power supply means may also supply power to the second circuit unit.

Moreover, the RFIC chip of the present invention can be realized by the following configuration. This RFIC chip includes: power supply means for receiving a radio wave and supplying power to circuits in the chip; a first circuit unit operating by receiving power supplied from the power supply means when the power supply means receives a first radio wave; and a second circuit unit which operates by receiving power supplied from the power supply means when the power supply means receives a second radio wave whose frequency is different from that of the first radio wave, and which holds predetermined data in a memory while the power supply means is receiving the second radio wave.

Here, in this RFIC chip, the first circuit unit may also operate by receiving power supplied from the power supply means and write data into the memory of the second circuit unit when the power supply means receives the second radio wave.

Furthermore, the present invention is also realized as a system including: the above-described RFIC chip; a reader for making communications with the RFIC chip by use of a first radio wave which enables the communications with the RFIC chip in an entire first area; and a writer for making communications with the RFIC chip by use of a second radio wave which enables the communications with the RFIC chip only in a second area set within the first area. In this system, the RFIC chip includes: power supply means for receiving any one of the first and second radio waves, and for supplying power to circuits in the chip; a first circuit unit operating by receiving power supplied from the power supply means when the power supply means receives the first radio wave; and a second circuit unit which operates by receiving power supplied from the power supply means when the power supply means receives the second radio wave, and which holds data in a memory while the power supply means is receiving the second radio wave. Further, when the RFIC chip is located in the first area, the reader makes communications with the RFIC chip, causes the first circuit unit to operate, and reads out data stored in the memory. Furthermore, when the RFIC chip is located in the second area, the writer makes communications with the RFIC chip, causes the second circuit unit to operate, and writes predetermined data into the memory. It is also possible to adopt a configuration in which a plurality of second areas are set in the first area, and in which each of the writers corresponding to the respective second areas writes unique data into the memory of the RFIC chip located in the corresponding second area.

Alternatively, in this system, the RFIC chip may include: power supply means for receiving any one of the first and second radio waves, and for supplying power to circuits in the chip; a first circuit unit operating by receiving power supplied from the power supply means when the power supply means receives the first radio wave; and a second circuit unit operating by receiving power supplied from the power supply means when the power supply means receives the second radio wave. In this case, any one of the first and second circuit units includes: a volatile memory; and write means for writing data into the volatile memory. The other circuit unit includes: a non-volatile memory; and read means for reading out data stored in the non-volatile memory on condition that particular data be held in the volatile memory. Further, when the RFIC chip is located in the first area, the reader makes communications with the RFIC chip, causes any one of the second circuit unit and the first circuit unit to operate, and reads out data stored in the non-volatile memory. Furthermore, when the RFIC chip is located in the second area, the writer makes communications with the RFIC chip, causes any one of the first circuit unit and the second circuit unit to operate, and writes the particular data into the volatile memory.

Alternatively, in this system, the RFIC chip may include: power supply means for receiving any one of the first and the second radio waves, and for supplying power to circuits in the chip; a first circuit unit operating by receiving power supplied from the power supply means when the power supply means receives the first radio wave; and a second circuit unit operating by receiving power supplied from the power supply means when the power supply means receives the second radio wave. In this case, any one of the first and second circuit units includes: a volatile memory; and write means for writing data into the volatile memory. The other circuit unit includes: a non-volatile memory; read-write means for reading data from, and writing data into, the non-volatile memory; and a cryptographic circuit executing cryptographic processing of data read from or to be written into the non-volatile memory using data held in the volatile memory as a cryptographic key. Further, when the RFIC chip is located in the first area, the reader makes communications with the RFIC chip, and causes any one of the first and second circuit units to operate, read data from, or write data into, the non-volatile memory, and execute cryptographic processing of the data using the cryptographic key. Furthermore, when the RFIC chip is located in the second area, the writer makes communications with RFIC chip, causes any one of the first and second circuit units to operate, and writes the data which serves as the cryptographic key into the volatile memory.

BRIEF DESCRIPTION OF THE DRAWINGS

For a more complete understanding of the present invention and the advantage thereof, reference is now made to the following description taken in conjunction with the accompanying drawings.

FIGS. 4A and 4B are diagrams showing the outline of a warehouse to which the position recognition system using the embodiment is applied.

DETAILED DESCRIPTION OF THE PREFERRED EMBODIMENTS

Hereinafter, a best mode (hereinafter referred to as an embodiment) for carrying out the present invention will be described in detail with reference to the accompanying drawings.

Figure 1:
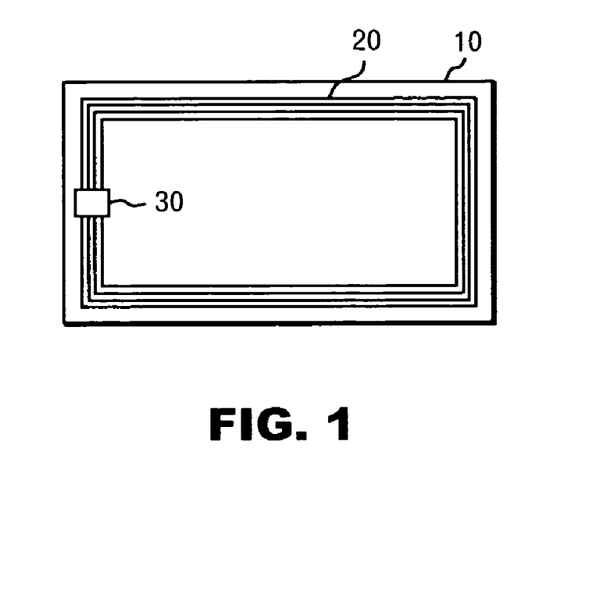
FIG. 1 is a diagram showing the configuration of an RFIC chip of an embodiment of the present invention.

FIG. 1 is a diagram schematically showing the configuration of an RFIC chip.

As shown in FIG. 1, an RFIC chip 10 includes an antenna 20 for wirelessly communicating with a reader/writer, and an IC module 30 which performs the processing (including transmission and reception using the antenna 20) and storage of data. The forms of RFIC chips 10 varies, such as a label type and a card type, and can be appropriately used depending on the intended use.

The antenna 20 detects a radio signal transmitted by radio waves (electromagnetic waves), converts the radio signal into an electric signal, and outputs the electric signal. The IC module 30 operates using the electric signal as operating power, and executes processing (calculation, the writing of received data into a memory, the reading and transmission of data from a memory, or the like) according to information contained in this electric signal.

Figure 2:
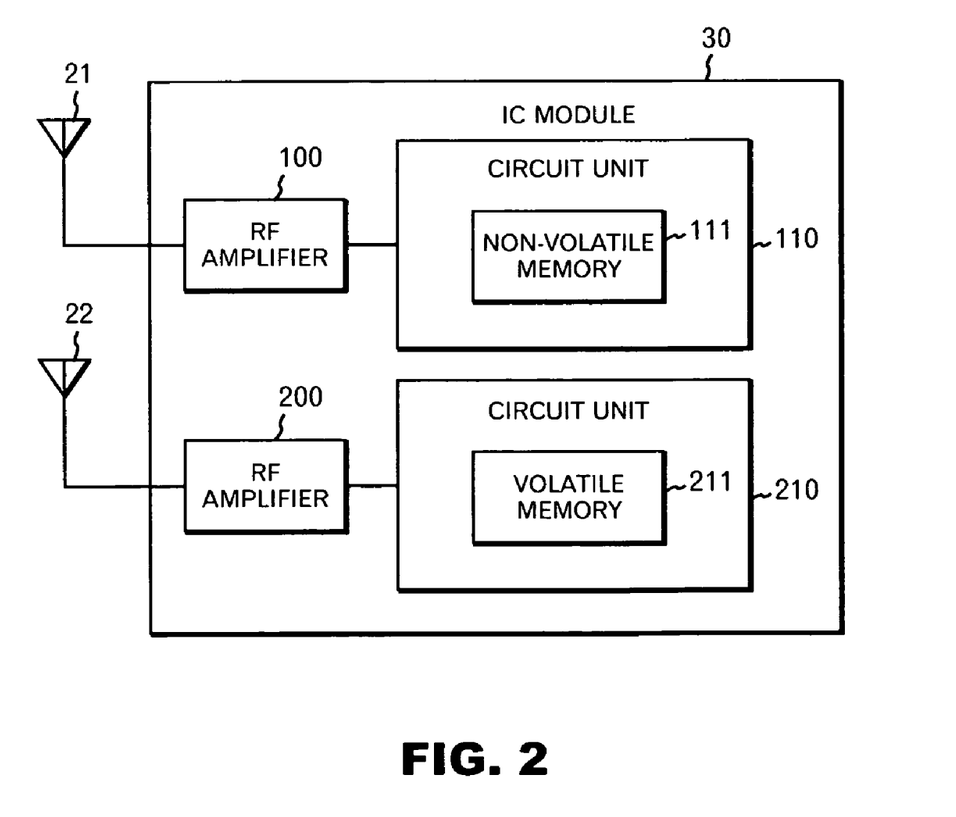
FIG. 2 is a diagram showing the configuration of an IC module in the embodiment.

FIG. 2 is a diagram showing the configuration of the IC module 30 in this embodiment.

Although a single antenna 20 is shown in FIG. 1, two antennas 21 and 22 are provided in this embodiment as shown in FIG. 2 so that radio waves of two frequencies can be used to operate the RFIC chip 10 and to transmit and receive data. Moreover, the IC module 30 of this embodiment includes two RF amplifiers (high frequency amplifier circuits) 100 and 200 respectively connected to the antennas 21 and 22, and two circuit units 110 and 210. Further, a non-volatile memory 111 is mounted in the circuit unit 110, and a volatile memory 211 is mounted in the circuit unit 210.

The RF amplifier 100 receives an electric signal from the antenna 21, and amplifies and outputs the electric signal. This electric signal contains information transmitted from a reader/writer. Further, this electric signal is supplied as operating power for the IC module 30 to the circuit unit 110. The RF amplifier 200 receives an electric signal from the antenna 22, and amplifies and outputs the electric signal. This electric signal contains information transmitted from a reader/writer. Further, this electric signal is supplied as operating power for the IC module 30 to the circuit unit 210.

The circuit unit 110 includes, as needed, a circuit for performing processing, such as arithmetic processing and the reading and writing of data from/into a memory. A specific configuration thereof is appropriately determined depending on the purpose, the usage, or the like of the RFIC chip 10, and therefore will be described in detail later. Note, however, that the circuit unit 110 includes the non-volatile memory 111 as a memory as described previously. Thus, data held in the circuit unit 110 is maintained without disappearing even when power supply from the RF amplifier 100 is cut off.

The circuit unit 210 includes, as needed, a circuit for performing processing, such as arithmetic processing and the reading and writing of data from/into a memory. A specific configuration thereof is appropriately determined depending on the purpose, the usage, or the like of the RFIC chip 10, and therefore will be described in detail later. Note, however, that the circuit unit 210 includes the volatile memory 211 as a memory as described previously. Thus, data held in the circuit unit 210 disappears when power supply from the RF amplifier 200 is cut off.

As described above, the specific circuit configurations of the circuit units 110 and 210 are appropriately determined depending on the purpose, the usage, or the like of the RFIC chip 10. However, at least, the circuit unit 110 has a configuration which is influenced in processing by the type and the presence of data held in the volatile memory 211 of the circuit unit 210. Specifically, for example, the following and the like can be conceived:

(1) Read-write means for reading data from, and writing data into, the volatile memory 211 is provided in the circuit unit 110.

(2) Data held in the volatile memory 211 is used as execution conditions for reading data from, and writing data into, the non-volatile memory 111 in the circuit unit 110.

(3) In data processing in the circuit unit 110, cryptographic processing is performed using a cryptographic key held in the volatile memory 211.

With the above-described configuration, the circuit unit 110 operates differently depending on whether predetermined data is held in the volatile memory 211 by receiving radio waves using the antenna 22 and supplying power to the circuit unit 210 or whether data stored in the volatile memory 211 has disappeared because power supply to the circuit unit 210 has been cut off. Hereinafter, specific configurations and operations of the circuit units 110 and 210 and the usage of the RFIC chip 10 will be described by giving a specific application example of the RFIC chip 10 of this embodiment.

APPLICATION EXAMPLE 1

Position Recognition System

A position recognition system capable of recognizing, in detail and with accuracy, position information concerning an item managed in a warehouse can be realized using the RFIC chip 10 of this embodiment.

Figure 3:
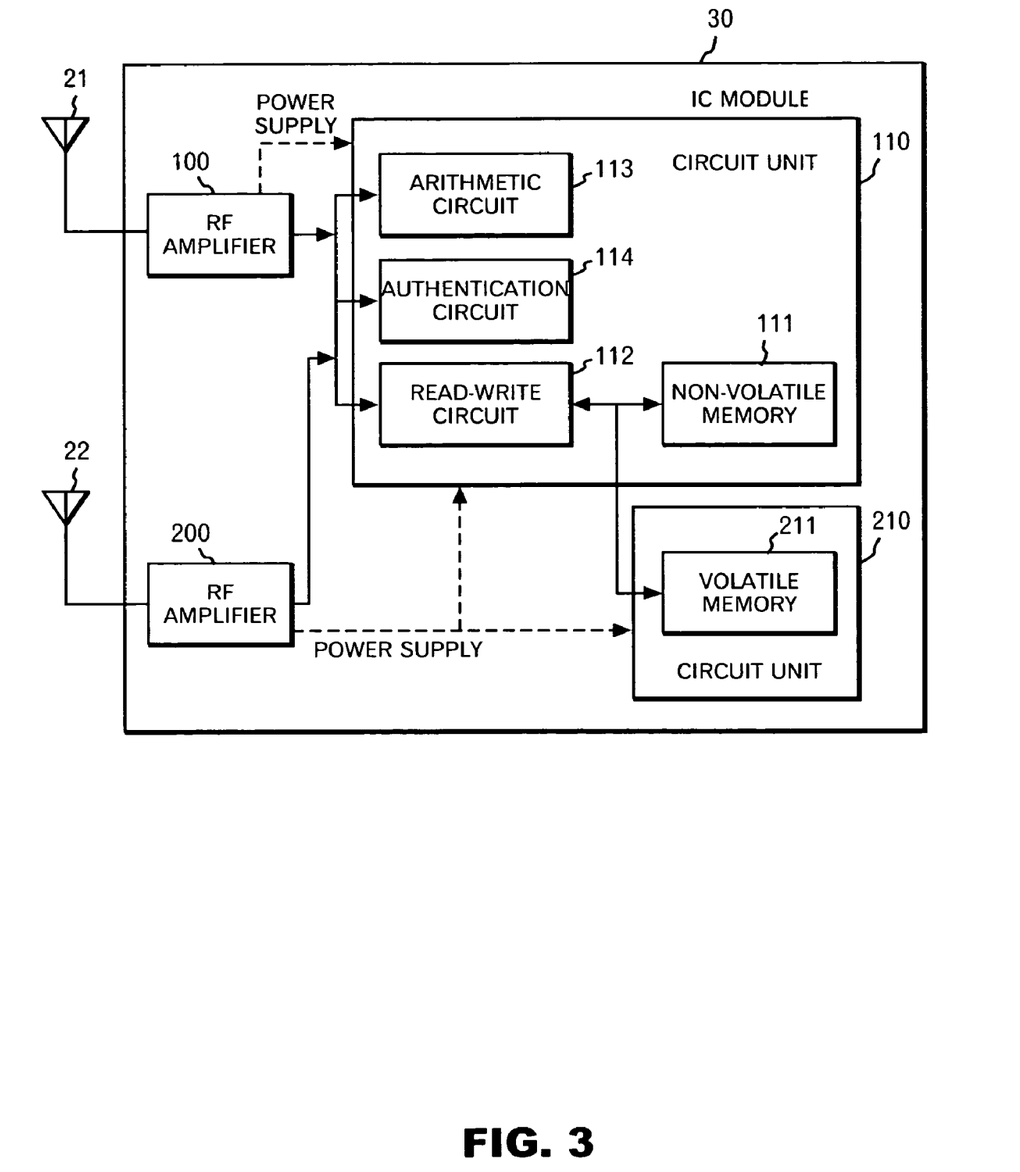
FIG. 3 is a diagram showing a specific configuration of an IC module mounted in an RFIC chip in a position recognition system using the embodiment.

FIG. 3 is a diagram showing a specific configuration of an IC module 30 mounted in an RFIC chip 10 used in the present system.

Referring to FIG. 3, the IC module 30 of the RFIC chip 10 includes two RF amplifiers 100 and 200, and two circuit units 110 and 210.

The circuit unit 110 includes anon-volatile memory 111, a read-write circuit 112, an arithmetic circuit 113, and an authentication circuit 114. On the other hand, the circuit unit 210 includes only a volatile memory 211. Further, the circuit unit 110 operates by receiving power from the RF amplifiers 100 and 200. On the other hand, the circuit unit 210 operates by receiving power only from the RF amplifier 200.

Based on received signals received by the antennas 21 and 22 and converted into electric signals by the RF amplifiers 100 and 200, the read-write circuit 112 of the circuit unit 110 reads data from, or writes data into, both of the non-volatile memory 111 mounted in the circuit unit 110 and the volatile memory 211 mounted in the circuit unit 210. Accordingly, the read-write circuit 112 can read data from, or write data into, both of the non-volatile memory 111 and the volatile memory 211 in the case where the circuit unit 110 is supplied with power from the RF amplifier 200 or from both of the RF amplifiers 100 and 200, i.e., in the case where the antenna 22 is receiving radio waves or where both of the antennas 21 and 22 are receiving radio waves. In contrast, in the case where the circuit unit 110 is supplied with power only from the RF amplifier 100, i.e., in the case where only the antenna 21 is receiving radio waves, data can be read from or written into only the non-volatile memory 111, and the volatile memory 211 cannot be accessed.

Incidentally, in the case where the circuit unit 210 is not supplied with power, the read-write circuit 112 recognizes a meaningless (i.e., meaning that meaningful data is not written in the volatile memory 211) fixed value as data read from the volatile memory 211. This is because, if the read-write circuit 112 attempts to read data from the volatile memory 211 and recognizes a random value in the case where the circuit unit 210 is not supplied with power, it is impossible to distinguish whether the recognized value is a value written in the volatile memory 211 or a random value recognized because of the impossibility of accessing the volatile memory 211. Specifically, for example, "00" or "FF" is assigned to this meaningless fixed value.

Moreover, the arithmetic circuit 113 of the circuit unit 110 performs various kinds of logical and arithmetic operations depending on the purpose of the RFIC chip 10 based on the received signals received by the antennas 21 and 22 and converted into electric signals by the RF amplifiers 100 and 200.

The authentication circuit 114 performs an authentication process on a user or a reader/writer, as a precondition for allowing the IC module 30 to operate, based on the received signals received by the antennas 21 and 22 and converted into electric signals by the RF amplifiers 100 and 200.

Figure 4:
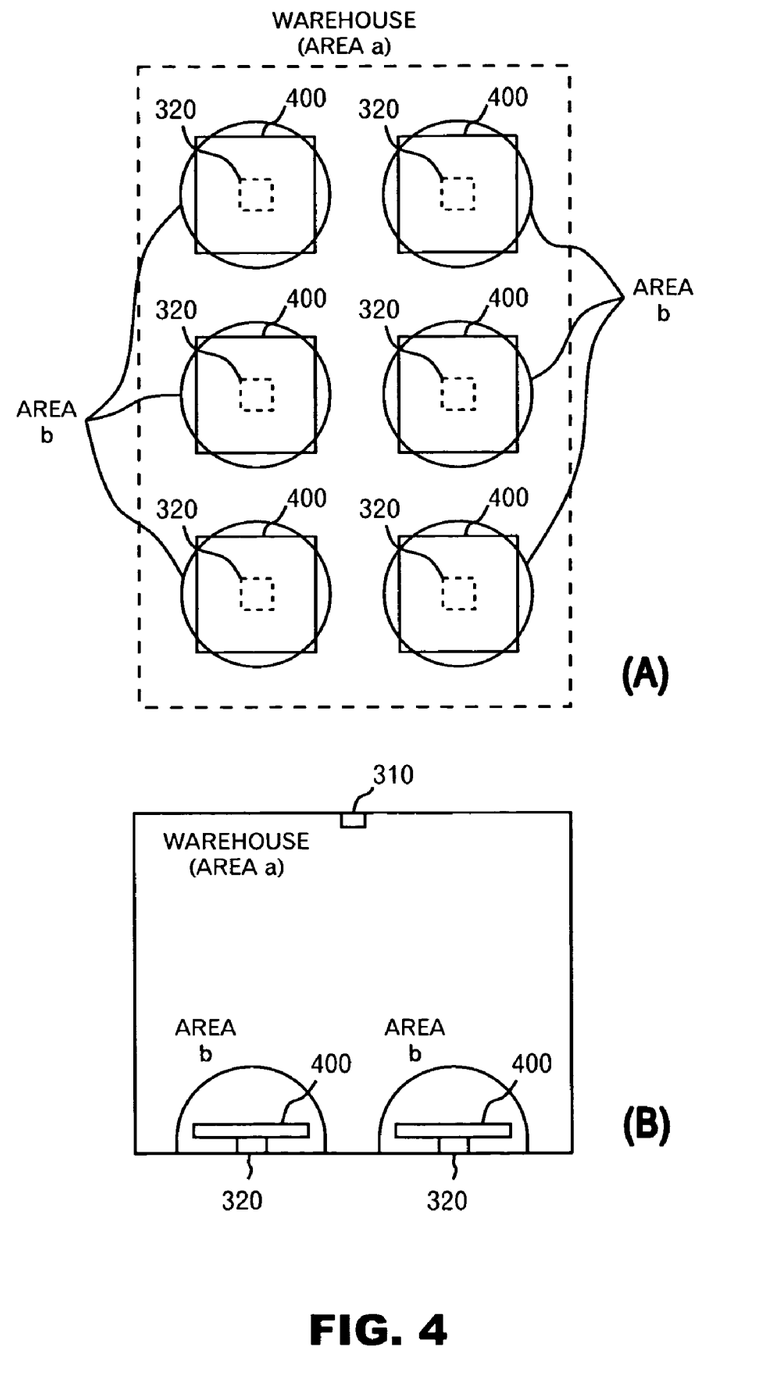
FIG. 4A shows the warehouse as seen from above.
FIG. 4B shows the warehouse as seen from a side.

FIGS. 4A and 4B are diagrams showing the outline of the warehouse to which the position recognition system of this application example is applied. FIG. 4A shows the warehouse as seen from above, and FIG. 4B shows the warehouse as seen from a side.

In the warehouse shown in FIGS. 4A and 4B, provided is a reader/writer 310 capable of communicating with the RFIC chip 10 in the entire area (area a) in the warehouse. Further, though not particularly shown, the reader/writer 310 is connected to an analyzer (computer) which performs position analysis. This analyzer recognizes which position in the warehouse the RFIC chip 10 is located at, based on data read from the RFIC chip 10 by the reader/writer 310.

Moreover, in the warehouse, one or more palettes 400 on which items are to be placed are provided at appropriate positions. Further, provided at the installation position of each palette 400 is a reader/writer 320 capable of communicating with the RFIC chip 10 in a range (area b) almost covering the palette 400. It is assumed that unique identification data is set for each palette 400, and that each of the reader/writers 320 corresponding to the respective palettes 400 writes identification data concerning the corresponding palette 400 into the volatile memory 211 of the circuit unit 210 of the RFIC chip 10 placed on the corresponding palette 400 (in the corresponding area b).

Here, in the RFIC chip 10, radio wave frequencies used for communications are determined by standards. However, the distance within which the RFIC chip 10 can communicate varies depending on which frequency is used. For example, the communication distance is 1.5 m at 13.56 MHz, or 3 to 7 m in the UHF band (860 MHz to 960 MHz). Accordingly, the above-described setting can be realized by using in the reader/writer 310 a frequency at which communications with the RFIC chip 10 are allowed even at long distances, and using in each reader/writer 320 placed near the corresponding palette 400 a frequency at which communications with the RFIC chip 10 are allowed only at short distances.

Also in the radio RFIC chip 10, frequencies of radio waves to be received by the antennas 21 and 22 are specified accordingly. In this application example, the antenna 21 receives radio waves (f1) from the reader/writer 310, and the antenna 22 receives radio waves (f2) from the reader/writer 320. This allows the circuit unit 110 to operate if an item having the RFIC chip 10 attached thereto exists in the warehouse (area a). On the other hand, the circuit unit 210 operates in the case where the item having the RFIC chip 10 attached thereto is placed on any one of the palettes 400 (areas b) in the warehouse.

Next, in the system configured as described above, suppose that an item A having the RFIC chip 10 attached thereto is carried into the warehouse and placed on any one of the palettes 400. It is assumed that identification data concerning the item A is recorded in the non-volatile memory 111 of the circuit unit 110 of the RFIC chip 10 attached to the item A. When the item A enters the warehouse, the reader/writer 310 becomes capable of communicating with the RFIC chip 10. At this time, since the circuit unit 210 of the RFIC chip 10 is not supplied with power, the read-write circuit 112 of the circuit unit 110 can read data from, or write data into, only the non-volatile memory 111. Accordingly, the reader/writer 310 reads the identification data concerning the item A, which is stored in the non-volatile memory 111, and transmits this identification data to the analyzer (not shown). Based on the data received from the reader/writer 310, the analyzer recognizes that the item A has entered the warehouse.

Moreover, at this point in time, the read-write circuit 112 recognizes aforementioned meaningless fixed value ("00" or "FF") as data of the volatile memory 211. The reader/writer 310 acquires this fixed value with the data read from the non-volatile memory 111, and transmits the fixed value to the analyzer. By receiving the fixed value, the analyzer recognizes that the item A is not placed on any palette 400.

Next, when the item A is placed on any one of the palettes 400 in the warehouse, the reader/writer 320 corresponding to this palette 400 becomes capable of communicating with the RFIC chip 10 (hereinafter, the palette 400 on which the item A is placed is referred to as a palette 400a). Then, the read-write circuit 112 of the circuit unit 110 of the RFIC chip 10 is controlled by the reader/writer 320, and identification data concerning this palette 400a is written into the volatile memory 211 of the circuit unit 210.

When the data is written into the volatile memory 211, the reader/writer 310 controls the read-write circuit 112 of the circuit unit 110, reads the identification data concerning the palette 400a, which is written in the volatile memory 211, and transmits this identification data to the analyzer (not shown). Based on the identification data concerning the palette 400a, which has been received from the reader/writer 310, the analyzer recognizes that the item A is placed on the palette 400a.

Next, suppose that the item A placed on the palette 400a is moved to other palette 400 (hereinafter, this palette is referred to as a palette 400b). When the item A is moved from the palette 400a by a forklift or other carrying means, radio waves (f2) from the reader/writer 320 corresponding to the palette 400a do not reach the RFIC chip 10. Consequently, power supply to the circuit unit 210 is cut off, and the data written in the volatile memory 211 disappears. Accordingly, the reader/writer 310 acquires the aforementioned fixed value instead of the identification data concerning the palette 400a, and transmits the fixed value to the analyzer (not shown). Since data received from the reader/writer 310 has changed from the identification data concerning the palette 400a to the fixed value, the analyzer recognizes that the item A has been moved from the palette 400a. Incidentally, during the time that the item A is moving on a passage, the reader/writers 320 corresponding to any palettes 400 cannot communicate with the RFIC chip 10. Accordingly, based on the data received from the reader/writer 310, the analyzer recognizes that the item A is not placed on any palette 400.

Then, when the item A is placed on the palette 400b in the warehouse, the reader/writer 320 corresponding to the palette 400b becomes capable of communicating with the RFIC chip 10. Further, identification data concerning the palette 400b is written in the volatile memory 211 of the circuit unit 210 by the reader/writer 320, and the identification data concerning the palette 400b, which is written in the volatile memory 211, is read and transmitted to the analyzer (not shown) by the reader/writer 310. Based on the identification data concerning the palette 400b which has been received from the reader/writer 310, the analyzer recognizes that the item A having the RFIC chip 10 attached thereto has moved to the palette 400b.

As described above, on which palette 400 an item carried into the warehouse is located can be accurately found using the position recognition system in which the positions, in the warehouse, of items having RFIC chips 10 attached thereto are managed. Accordingly, for example, in the case where a warehouse manager attempts to take a predetermined item out of the warehouse, the warehouse manager can know which position in the warehouse the desired item is located by reading position information written in the volatile memory 211 of the circuit unit 210 of the RFIC chip 10 attached to the desired item using the reader/writer 310.

Further, as described previously, in the present system, in the case where an item having an RFIC chip 10 attached thereto has been moved from a palette 400, identification data concerning the palette 400 which has been written in the volatile memory 211 automatically disappears. Accordingly, after an item has been taken out of the warehouse, or in such a case that an item has fallen onto a place other than the palettes 400 such as a passage in the warehouse, the analyzer recognizes that the item is not placed on any palette 400. Thus, more accurate and detailed position recognition of items can be realized.

Moreover, in situations where items frequently move, such as product-manufacturing sites, the state of movement of a desired item can also be grasped in real time by continuously recognizing the positions of items using the position recognition system of this application example.

APPLICATION EXAMPLE 2

Security System

Using the RFIC chip 10 of this embodiment, a security system in which confidentiality is ensured by controlling the reading of information stored in a memory in the chip can be realized.

Figure 5:
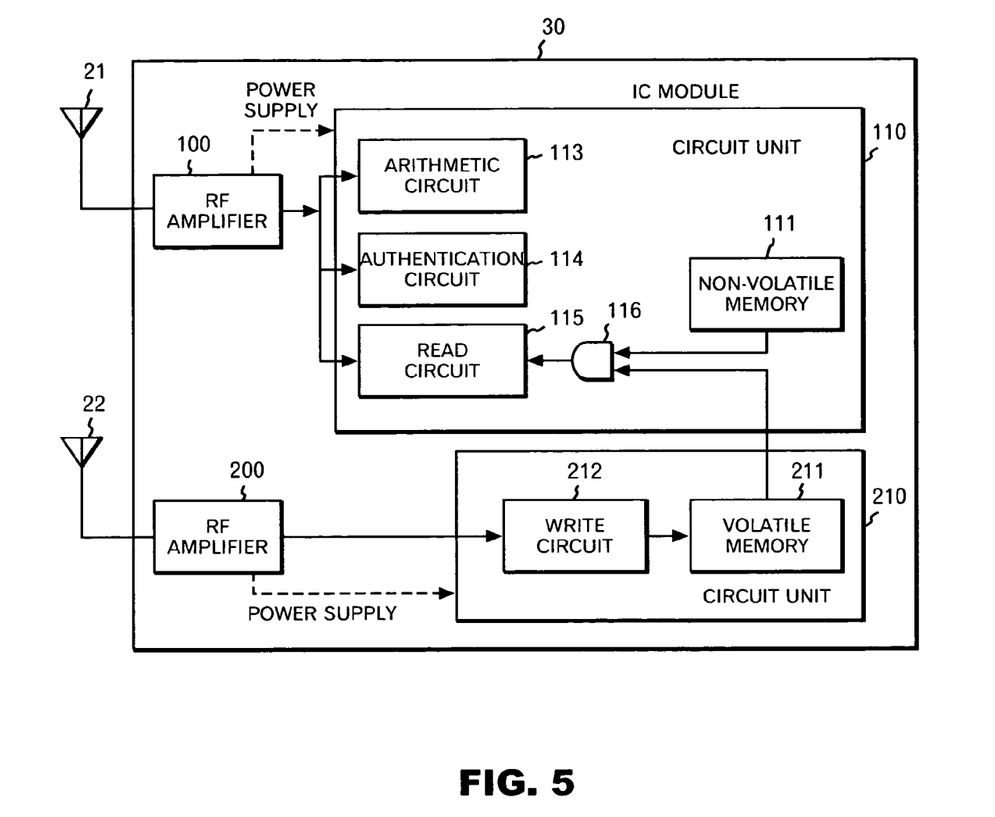
FIG. 5 is a diagram showing a specific configuration of an IC module mounted in an RFIC chip in a security system using the embodiment.

FIG. 5 is a diagram showing a specific configuration of an IC module 30 mounted in an RFIC chip 10 used in the present system.

Referring to FIG. 5, the IC module 30 of the RFIC chip 10 includes two RF amplifiers 100 and 200, and two circuit units 110 and 210.

The circuit unit 110 includes a non-volatile memory 111, an arithmetic circuit 113, an authentication circuit 114, a read circuit 115, and an AND circuit 116. Of these, the arithmetic circuit 113 and the authentication circuit 114 are the same as those of the aforementioned application example 1 and therefore denoted by the same reference numerals, and will not be further described. The circuit unit 210 includes a volatile memory 211 and a write circuit 212. Further, the circuit unit 110 operates by receiving power only from the RF amplifier 100, and the circuit unit 210 operates by receiving power only from the RF amplifier 200.

The read circuit 115 of the circuit unit 110 reads data stored in the non-volatile memory 111, based on a signal received by an antenna 21 and converted into an electric signal by the RF amplifier 100. On the other hand, the write circuit 212 of the circuit unit 210 writes data into the volatile memory 211 based on a signal received by an antenna 22 and converted into an electric signal by the RF amplifier 200.

The read circuit 115 of the circuit unit 110 is connected to the non-volatile memory 111 and the volatile memory 211 of the circuit unit 210 through the AND circuit 116. Accordingly, the read circuit 115 can read data stored in the non-volatile memory 111 only in the case where data "1" is written in the volatile memory 211, but cannot read the data stored in the non-volatile memory 111 in the case where data "0" is written in the volatile memory 211. Consequently, in the case where the circuit unit 210 is not supplied with power from the RF amplifier 200 and where the content of the volatile memory 211 is cleared to "0," the read circuit 115 cannot read data stored in the non-volatile memory 111.

Incidentally, in this application example, unlike the aforementioned application example 1, the circuit unit 110 is supplied with power only from the RF amplifier 100, and the circuit unit 210 is supplied with power only from the RF amplifier 200. As a result, the read circuit 115 of the circuit unit 110 can read data from the non-volatile memory 111 only when both of the antennas 21 and 22 are receiving radio waves. Thus, the level of security can be raised.

Figure 6:
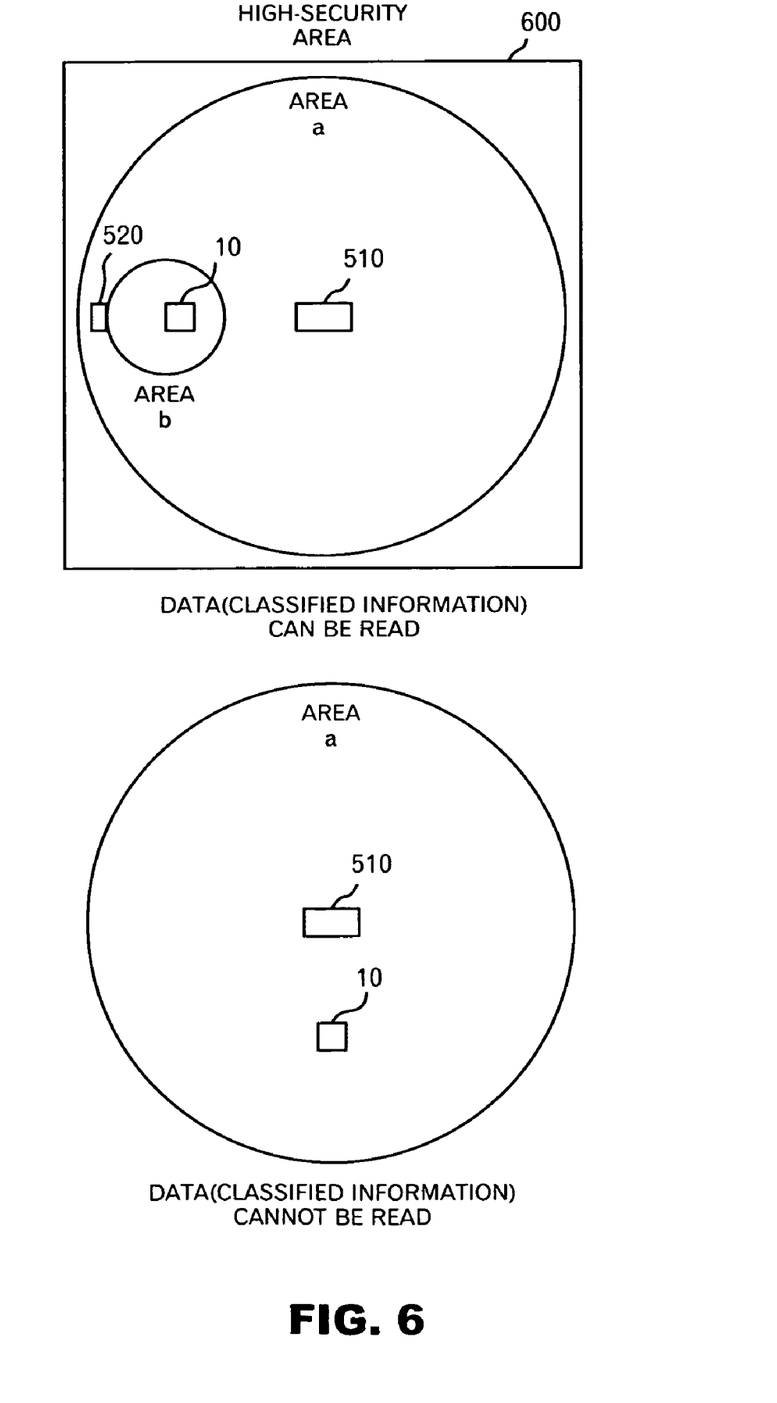
FIG. 6 is a diagram showing a system configuration for reading data from, and writing data into, the RFIC chip in the security system using the embodiment.

FIG. 6 is a diagram showing a system configuration for reading data from, and writing data into, the RFIC chip 10 in this application example.

In this application example, used are a reader/writer 510 for reading data (classified information) stored in the non-volatile memory 111 of the circuit unit 110 of the RFIC chip 10, and a reader/writer 520 for writing data "1" into the volatile memory 211 of the circuit unit 210. As shown in FIG. 6, it is assumed that the reader/writer 520 is placed in a high-security area 600, and that the RFIC chip 10 can be brought in the high-security area 600 only in the case where conditions set depending on the level of security are satisfied. Further, the high-security area 600 is shielded so that radio waves do not leak.

The reader/writers 510 and 520 communicate with the RFIC chip 10 using radio waves having different frequencies, respectively. Further, in the RFIC chip 10, the antenna 21 receives radio waves (f1) from the reader/writer 510, and the antenna 22 receives radio waves (f2) from the reader/writer 520. Thus, the circuit unit 210 of the RFIC chip 10 operates only in the case where it is located in the high-security area 600 in a range in which communications with the reader/writer 520 are allowed.

Incidentally, in the example shown in FIG. 6, the range (area a) in which the reader/writer 510 can communicate with the RFIC chip 10 is wider, and the range (area b) in which the reader/writer 520 can communicate with the RFIC chip 10 is narrower. However, in this application example, it is essential only that the frequency used for communicating with the RFIC chip 10 by the reader/writer 510 be different from the frequency used for communicating with the RFIC chip 10 by the reader/writer 520. Whether the ranges in which communications are allowed are wide or narrow does not become a problem. In practice, frequencies at which desired communication ranges (communication distances) can be ensured may be used depending on an embodiment of a system.

Next, in the system configured as described above, suppose that information stored in the non-volatile memory 111 of the circuit unit 110 of the RFIC chip 10 is attempted to be read by use of the reader/writer 510. In the case where the RFIC chip 10 is outside the high-security area 600, radio waves (f2) from the reader/writer 520 do not reach the RFIC chip 10. As a result, the circuit unit 210 is not supplied with power, and the content of the volatile memory 211 is "0." Accordingly, the read circuit 115 of the circuit unit 110 cannot read data (classified information) stored in the non-volatile memory 111.

When the RFIC chip 10 is brought in the high-security area 600 and approaches the reader/writer 520 in the state where predetermined conditions are satisfied, the reader/writer 520 becomes capable of communicating with the RFIC chip 10. Then, radio waves (f2) from the reader/writer 520 are received by the antenna 22, the circuit unit 210 is supplied with power from the RF amplifier 200, and the write circuit 212 writes data "1" into the volatile memory 211. Incidentally, settings may be made so that the write circuit 212 automatically writes data "1" into the volatile memory 211 when being supplied with power, or that the write circuit 212 writes received data (data "1") into the volatile memory 211 according to a signal received from the reader/writer 520.

When data "1" has been written into the volatile memory 211, the read circuit 115 of the circuit unit 110 becomes capable of reading data (classified information) stored in the non-volatile memory 111. Accordingly, data (classified information) stored in the non-volatile memory 111 is read by controlling the read circuit 115 using the reader/writer 510.

Next, when the RFIC chip 10 is moved from the reader/writer 520 and leaves the range (area b) in which communications with the reader/writer 520 are allowed, radio waves (f2) from the reader/writer 520 do not reach the RFIC chip 10. As a result, power supply to the circuit unit 210 is cut off, data written in the volatile memory 211 disappears, and the memory content becomes "0." Accordingly, the reader/writer 510 again becomes incapable of reading data (classified information) stored in the non-volatile memory 111.

Incidentally, in this application example, classified information is stored in the non-volatile memory 111. However, in addition to the non-volatile memory 111, another non-volatile memory may be provided in the circuit unit 110 to store unclassified information. In this case, the another non-volatile memory is connected directly to the read circuit 115 not through the AND circuit 116. This makes it possible to read unclassified information using the reader/writer 510 anytime.

APPLICATION EXAMPLE 3

Security System Using Cryptography

Using the RFIC chip 10 of this embodiment, a security system which uses cryptography and which is different from Application Example 2 can be realized.

Figure 7:
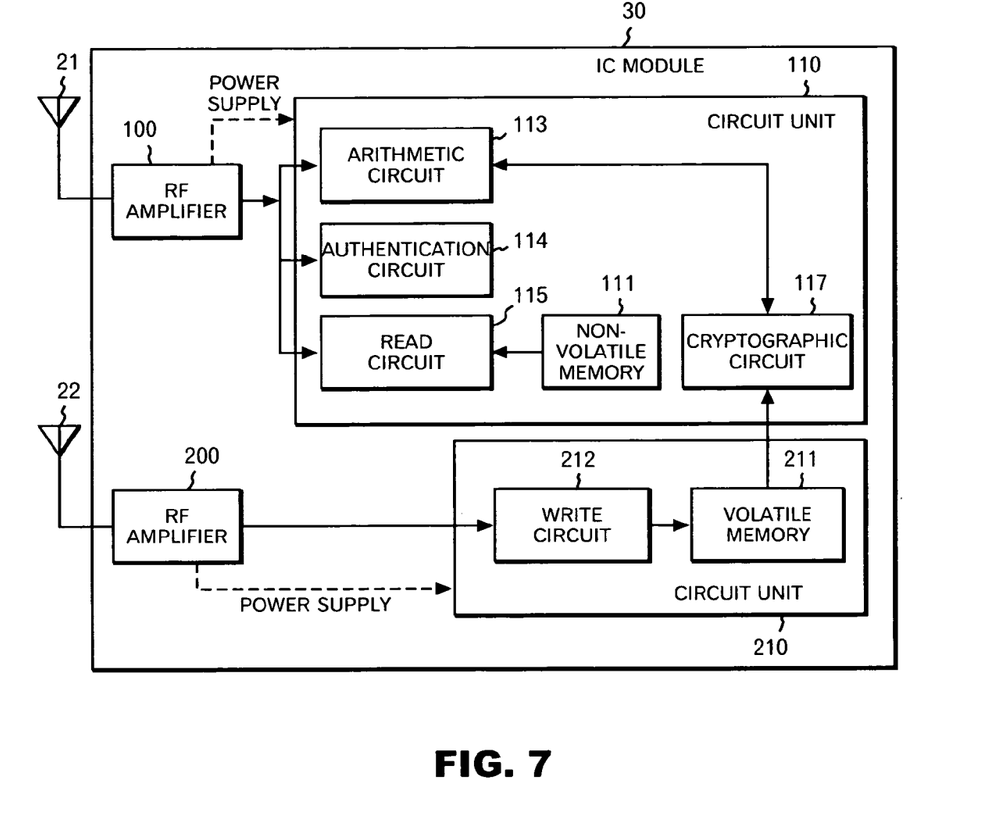
FIG. 7 is a diagram showing a specific configuration of an IC module mounted in an RFIC chip in another security system using the embodiment.

FIG. 7 is a diagram showing a specific configuration of an IC module 30 mounted in an RFIC chip 10 used in the present system.

Referring to FIG. 7, the IC module 30 of the RFIC chip 10 includes two RF amplifiers 100 and 200, and two circuit units 110 and 210.

The circuit unit 110 includes a non-volatile memory 111, an arithmetic circuit 113, an authentication circuit 114, a read circuit 115, and a cryptographic circuit 117. The circuit unit 210 includes a volatile memory 211 and a write circuit 212. Of these, the arithmetic circuit 113, the authentication circuit 114, and the read circuit 115 of the circuit unit 110, and the write circuit 212 of the circuit unit 210, are the same as those of the aforementioned application example 2 and therefore denoted by the same reference numerals, and will not be further described. Further, the circuit unit 110 operates by receiving power only from the RF amplifier 100, and the circuit unit 210 operates by receiving power only from the RF amplifier 200.

The cryptographic circuit 117 of the circuit unit 110 executes the cryptographic processing (encryption of data or decryption of encrypted data) of data processed by the arithmetic circuit 113. In cryptographic processing executed by the cryptographic circuit 117, data written in the volatile memory 211 of the circuit unit 210 is used as a cryptographic key. Accordingly, the cryptographic circuit 117 can execute the cryptographic processing of data only in the case where the circuit unit 210 is supplied with power from the RF amplifier 200 and where a cryptographic key is written in the volatile memory 211.

Further, the cryptographic circuit 117 can perform the cryptographic processing of data to be read from or written into the non-volatile memory 111. That is, when data is written into the non-volatile memory 111, the data to be written can be encrypted; when encrypted data stored in the non-volatile memory 111 is read, the data to be read can be decrypted.

Incidentally, also in this application example, as in application example 2, the circuit unit 110 is supplied with power only from the RF amplifier 100, and the circuit unit 210 is supplied with power only from the RF amplifier 200. As a result, the cryptographic circuit 117 of the circuit unit 110 can execute the cryptographic processing of data only when both of antennas 21 and 22 are receiving radio waves. Thus, the level of security can be raised.

Figure 8:
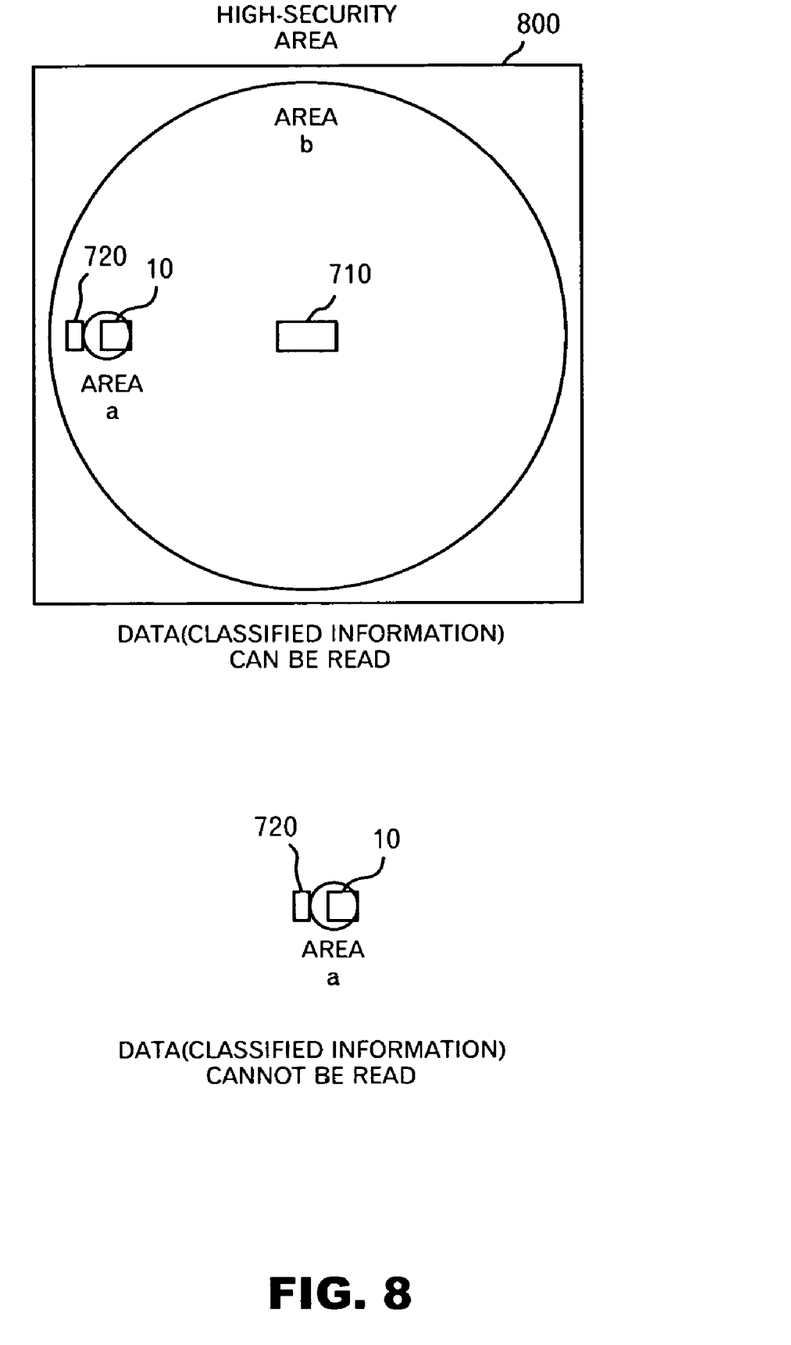
FIG. 8 is a diagram showing a system configuration for reading data from, and writing data into, the RFIC chip in the another security system using the embodiment.

FIG. 8 is a diagram showing a system configuration for reading data from, and writing data into, the RFIC chip 10 in this application example.

In this application example, used are a reader/writer 710 for reading data (classified information) stored in the non-volatile memory 111 of the circuit unit 110 of the RFIC chip 10, and a reader/writer 720 for writing a cryptographic key into the volatile memory 211 of the circuit unit 210. As shown in FIG. 8, it is assumed that the reader/writer 720 is placed in a high-security area 800, and that the RFIC chip 10 can be brought in the high-security area 800 only in the case where conditions set depending on the level of security are satisfied. Further, the high-security area 800 is shielded so that radio waves do not leak.

The reader/writers 710 and 720 communicate with the RFIC chip 10 using radio waves having different frequencies, respectively. Further, in the RFIC chip 10, the antenna 21 receives radio waves (f1) from the reader/writer 710, and the antenna 22 receives radio waves (f2) from the reader/writer 720. Thus, the circuit unit 210 of the RFIC chip 10 operates only in the case where it is located in the high-security area 800 in a range in which communications with the reader/writer 720 are allowed.

Incidentally, in the example shown in FIG. 8, the range (area b) in which the reader/writer 720 can communicate with the RFIC chip 10 is wider, and the range (area a) in which the reader/writer 710 can communicate with the RFIC chip 10 is narrower. However, in this application example, it is essential only that the frequency used for communicating with the RFIC chip 10 by the reader/writer 720 be different from the frequency used for communicating with the RFIC chip 10 by the reader/writer 710. Whether the ranges in which communications are allowed are wide or narrow does not become a problem. In practice, frequencies at which desired communication ranges (communication distances) can be ensured may be used depending on an embodiment of a system.

Next, in the system configured as described above, suppose that information stored in the non-volatile memory 111 of the circuit unit 110 of the RFIC chip 10 is attempted to be read by use of the reader/writer 710. It is assumed that encrypted data are stored in the non-volatile memory 111. In the case where the RFIC chip 10 is outside the high-security area 800, radio waves (f2) from the reader/writer 720 do not reach the RFIC chip 10. As a result, the circuit unit 210 is not supplied with power, data to serve as a cryptographic key is not held in the volatile memory 211. Accordingly, even if the read circuit 115 of the circuit unit 110 reads data (classified information) stored in the non-volatile memory 111, the cryptographic circuit 117 cannot decrypt the read data. Thus, data acquired by the reader/writer 710 is meaningless data remaining encrypted.

When the RFIC chip 10 is brought in the high-security area 800 and approaches the reader/writer 720 in the state where predetermined conditions are satisfied, the reader/writer 720 becomes capable of communicating with the RFIC chip 10. Then, radio waves (f2) from the reader/writer 720 are received by the antenna 22, and the circuit unit 210 is supplied with power from the RF amplifier 200. Further, the write circuit 212 writes a cryptographic key into the volatile memory 211 based on a signal contained in the radio waves (f2) from the reader/writer 720.

When the cryptographic key is written into the volatile memory 211, the cryptographic circuit 117 of the circuit unit 110 becomes capable of decrypting encrypted data read from the non-volatile memory 111 using the cryptographic key. Accordingly, desired data (classified information) is acquired by controlling the read circuit 115 using the reader/writer 710 to read data from the non-volatile memory 111, and by decrypting the read data using the cryptographic circuit 117.

Next, when the RFIC chip 10 is moved from the reader/writer 720 and placed out of the range (area b) in which communications with the reader/writer 720 are allowed, radio waves (f2) from the reader/writer 720 do not reach the RFIC chip 10. As a result, power supply to the circuit unit 210 is cut off, and the cryptographic key written in the volatile memory 211 disappears. Accordingly, the cryptographic circuit 117 again becomes incapable of decrypting data (classified information) read from the non-volatile memory 111, and data acquired by the reader/writer 710 is meaningless data remaining encrypted.

Incidentally, in this application example, a description has been given of the relationship between the reader/writers 710 and 720 for the case where data read from the non-volatile memory 111 is decrypted. However, the relationship therebetween is also the same in the cases where data to be stored in the non-volatile memory 111 is encrypted and where the cryptographic processing of data is executed in a process other than that for reading data from, or writing data into, the non-volatile memory 111.

According to the present invention configured as described above, the convenience of an RFIC chip can be improved by realizing in the RFIC chip a mechanism for holding data only when the RFIC chip is receiving radio waves from a reader/writer and for allowing the data to disappear when the reception of radio waves stops.

Although the preferred embodiment of the present invention has been described in detail, it should be understood that various changes, substitutions and alternations can be made therein without departing from spirit and scope of the inventions as defined by the appended claims.

What is claimed is:

1. A first radio frequency integrated circuit chip, comprising:
a first circuit unit including a non-volatile memory reading from, and writing a first data into, the non-volatile memory;
a second circuit unit including a first volatile memory reading from, and writing a second data into, the first volatile memory;
the second data held in the first volatile memory holding execution conditions and reading first data from and writing the second data to, the non-volatile memory;
a first power supply with a first receiver receiving a first radio wave, and supplying power as a first electrical signal to the first circuit unit; and
a second power supply with a second receiver receiving a second radio wave whose frequency is different from that of the first radio wave, and supplying power as a second electrical signal to the second circuit unit,
wherein the first electrical signal which supplies power to the first circuit unit and the second electrical signal which supplies power to the second circuit unit contain information transmitted from a reader and a writer;
an integrated circuit module performing processing and storage of the first data and the second data according to information contained in the first electrical signal supplied as power and according to information contained in the second electrical signal supplied as power;
wherein the first circuit unit reads predetermined data to be maintained while the first volatile memory of the second circuit unit receives power supplied from the second power supply and the second power supply receives the second radio wave, by receiving the power supplied from the first power supply;
wherein the processing and storage of the first data within the first circuit unit including the first volatile memory changes based on whether the second receiver is currently receiving the second radio wave;
wherein the first radio frequency integrated circuit chip uses variable radio frequency communication levels depending on a use of the first circuit unit and the second circuit unit,
wherein the first radio frequency integrated circuit chip is configured depending on a purpose, and depending on a usage of the first radio frequency integrated circuit chip,
wherein the first volatile memory of the second circuit unit is only accessible during simultaneous operation of the first power supply and the second power supply, and
wherein the reading and writing of the first radio frequency integrated circuit chip is controlled by a second radio frequency integrated circuit chip.

2. The first radio frequency integrated circuit chip according to claim 1, wherein:
the second power supply supplies power to the first circuit unit;
the first circuit unit operates from power from multiple amplifiers, and the second circuit unit operates from power from a single amplifier; and
the first volatile memory of the second circuit unit includes identification information regarding the structure supporting the second circuit unit.

3. A position recognition system, comprising:
a plurality of radio frequency integrated circuit chips including a first radio frequency integrated circuit chip;
a reader that communicates with the first radio frequency integrated circuit chip by use of a first radio wave that enables communications of the reader with the first radio frequency integrated circuit chip in an entire first area; and
a writer that communicates with the first radio frequency integrated circuit chip by use of a second radio wave that enables communications of the writer with the first radio frequency integrated circuit chip only in a second area within the first area, and with the second radio wave, which has different frequency from the first radio wave;
a computer connected to the reader and the writer, wherein the computer performs position analysis and recognizes the position of the first radio frequency integrated circuit chip based on information from the reader and the writer; and
multiple ones of the plurality of radio frequency integrated circuit chips with each including an instance of the reader and an instance of the writer positioned at predetermined points which communicate position information with the first radio frequency integrated circuit chip using variable radio frequency communication levels,
wherein each of the plurality of radio frequency integrated circuit chips comprises:
a first circuit unit including:
a non-volatile memory that the first circuit unit is operable to read from and write first data into an arithmetic circuit for performing arithmetic operations depending on a purpose of each of the plurality of radio frequency integrated circuit chips; and
an authentication circuit for performing an authentication process of the reader and the writer that is operable to allow the reader to access the first data within the non-volatile memory if each of the plurality of radio frequency integrated circuit chips is located within the second area, and is further operable to prevent access to the first data within the non-volatile memory if one of the plurality of radio frequency integrated circuit chips is located within the first area but outside of the second area;
a second circuit unit including a volatile memory that is operable to read out second data stored in the volatile memory and to write predetermined data into the volatile memory of the second circuit unit if one of the plurality of radio frequency integrated circuit chips is located in the second area and is communicating with the writer;
a first power supply with a first receiver for receiving the first radio wave, and for supplying power to the first circuit unit; and
a second power supply with a second receiver for receiving the second radio wave, and for supplying power to the second circuit unit, and
wherein the first circuit unit is operable to read the first data to be maintained while the volatile memory of the second circuit unit receives power supplied from the second power supply and the second power supply with the second receiver receives the second radio wave, by receiving power supplied from the first power supply.

4. The position recognition system according to claim 3, wherein
a plurality of third areas are set in the first area, and each of the writers corresponding to the third areas writes unique data into the volatile memory of one of the plurality of radio frequency integrated circuit chips located in the corresponding second area; and wherein
the plurality of units that communicate position information are movable; and the volatile memory of the radio frequency integrated circuit chip located in the corresponding second area includes identification information regarding the structure supporting the current position.

5. A method comprising:

reading from, and writing first data into, the non-volatile memory of a first circuit unit within a first radio frequency integrated circuit chip;

reading from, and writing second data into, a first volatile memory of a second circuit unit within the first radio frequency integrated circuit chip;

automatically writing received second data into the first volatile memory at the time power is received;

holding performance conditions by a first data held in the first volatile memory and reading data from and writing data to, the non-volatile memory;

receiving a first radio wave by a first power supply with a first receiver, and supplying power as a first electrical signal to the first circuit unit; and receiving a second radio wave whose frequency is different from that of the first radio wave by a second power supply with a second receiver, and supplying power as a second electrical signal to the second circuit unit, wherein the first electrical signal which supplies power to the first circuit unit and the second electrical signal which supplies power to the second circuit unit contain information transmitted from a reader and a writer; and performing processing and storage of the first data and the second data according to information contained in the first electrical signal supplied as power and according to information contained in the second electrical signal supplied as power;

controlling the first radio frequency integrated circuit chip by a second radio frequency integrated circuit chip; and transmitting the identification data away from the first radio frequency integrated circuit chip for analysis;

wherein reading predetermined data by the first circuit unit to be maintained while the first volatile memory of the second circuit unit receives power supplied from the second power supply and the second power supply receives the second radio wave, by receiving the power supplied from the first power supply;

wherein the first radio frequency integrated circuit chip uses variable radio frequency communication levels depending on a use of the first circuit unit and the second circuit unit, and wherein the first radio frequency integrated circuit chip is configured depending on a purpose, and depending on a usage of the first radio frequency integrated circuit chip.

6. The method according to claim 5, including:

supplying power to the first circuit unit by the second power supply;

changing the radio frequency based on the distance from a sending communication; and including identification information regarding the structure supporting the second circuit unit in the first volatile memory of the second circuit unit.

* * * * *